(12) United States Patent
Cheung

(10) Patent No.: US 7,817,810 B2
(45) Date of Patent: Oct. 19, 2010

(54) FLAT PANEL LOUDSPEAKER SYSTEM

(75) Inventor: Kwun-Wing W. Cheung, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 1147 days.

(21) Appl. No.: 11/196,023

(22) Filed: Aug. 3, 2005

(65) Prior Publication Data

US 2007/0030985 A1    Feb. 8, 2007

(51) Int. Cl.
    *H04R 25/00* (2006.01)
(52) U.S. Cl. .................. 381/152; 381/389; 244/118.5; 244/119
(58) Field of Classification Search ................. 381/152, 381/389
    See application file for complete search history.

(56) References Cited

U.S. PATENT DOCUMENTS

| | | | |
|---|---|---|---|
| 5,699,438 A * | 12/1997 | Smith et al. ............... 381/386 |
| 6,031,926 A | 2/2000 | Azima et al. | |
| 6,058,196 A | 5/2000 | Heron | |
| 6,144,746 A | 11/2000 | Azima et al. | |
| 6,188,775 B1 | 2/2001 | Azima et al. | |
| 6,198,831 B1 | 3/2001 | Azima et al. | |
| 6,215,882 B1 | 4/2001 | Heron | |
| 6,237,715 B1 * | 5/2001 | Tracy ......................... 181/156 |
| 6,247,551 B1 | 6/2001 | Heron | |
| 6,304,661 B1 | 10/2001 | Azima et al. | |
| 6,327,369 B1 | 12/2001 | Azima et al. | |
| 6,332,029 B1 * | 12/2001 | Azima et al. ............... 381/152 |
| 6,377,695 B1 * | 4/2002 | Azima et al. ............... 381/152 |
| 6,442,282 B2 * | 8/2002 | Azima et al. ............... 381/152 |
| 6,478,109 B1 | 11/2002 | Kam | |
| 6,519,347 B1 | 2/2003 | Morecroft et al. | |
| 6,519,349 B1 | 2/2003 | Azima et al. | |
| 6,681,026 B2 | 1/2004 | Kam | |
| 6,826,285 B2 * | 11/2004 | Azima ........................ 381/152 |
| 7,088,836 B1 * | 8/2006 | Bachmann et al. ......... 381/152 |
| 7,283,637 B2 * | 10/2007 | Suzuki et al. .............. 381/152 |

FOREIGN PATENT DOCUMENTS

| WO | WO 92/03024 | 2/1992 |
|---|---|---|
| WO | WO 98/26630 | 6/1998 |

\* cited by examiner

*Primary Examiner*—Suhan Ni
*Assistant Examiner*—Jasmine Pritchard
(74) *Attorney, Agent, or Firm*—Yee & Associates, P.C.; John A. Lepore

(57) ABSTRACT

A flat panel speaker system is provided. The system includes, a modified panel having a front surface and a rear surface, wherein the modified panel acts as a diaphragm for the flat panel speaker system; a supporting member coupled to the rear surface of the modified panel; and a detachable driver operationally coupled to the supporting member.

25 Claims, 5 Drawing Sheets

FLAT PANEL LOUDSPEAKER SYSTEM

BACKGROUND OF THE INVENTION

1. Field of the Invention

This invention relates to speakers, and more particularly, but not exclusively, to flat panel loudspeakers used in public address systems.

2. Background

Loudspeakers today come in different configurations. A loudspeaker takes an electrical signal and translates it into physical vibrations to create sound waves.

A common loudspeaker configuration uses a driver (or exciter) that produces sound waves by rapidly pushing and pulling (piston action) a light weight, rigid cone or a diaphragm. The cone is usually made of paper, plastic or metal, and is attached to a suspension module. The "cone" shape is used to create a light weight but rigid mechanical structure, so that it can be effectively driven by the driver, exciter or motor. The suspension module, or surround, is a rim of flexible material (or specially contoured shape of the same cone material) that allows the cone to move, controlling the cone's maximum amplitude and is attached to the driver's metal frame, called the basket. The narrow end of the cone is connected to a voice coil. The voice coil is attached to the basket by a spider (suspension spring of the voice coil), a ring of flexible material. The spider holds the coil in position (within a magnetic gap), but allows it to move freely back and forth.

The foregoing conventional configuration has short comings in certain situations, for example, in an aircraft public addressing environment. A "cone diaphragm" type loudspeaker is tough to install in an aircraft interior environment. For example, the assembly height can be high (2 to 3 inches in general), heavy and also requires a speaker grill. In airplane interior, space and weight savings are very important. In addition, a cone speaker also has very narrow angle sound projection (very directional because it operates as a "horn speaker") that does not provide adequate coverage for an aircraft interior. Therefore, a flat panel loudspeaker configuration is more suitable for aircraft public addressing ("PA") systems.

Flat panel loudspeakers (may also be referred to herein as "speakers" or "flat panel speaker" throughout this application) are desirable in aircraft audio systems (for example, the aircraft PA system) because they can blend in easily with the interior of an aircraft. For example, no dissimilar appearance speaker grill is used that may ruin the uniform look of aircraft interior paneling, and also no holes are needed to install the speakers. Further more, flat panel speaker are low profile (approximately 1 inch in height), and very light weight.

The material used for a flat panel speaker and the method of installation of the speaker are very important. The present day airplanes use conventional fasteners, such as screws and nut plates, to affix the speakers on the airplane panel. This method of direct installation of the speaker on the interior aircraft panel has known to cause damage to the panel during installation. The aircraft panel may also suffer damage during maintenance or replacement of the speaker.

Another shortcoming of conventional flat panel speakers is that the drivers are not detachable. Hence, if anything goes wrong with the driver, the entire speaker assembly (in case of airplane interior application, this means replacement of entire piece of interior panel, which is very expensive) has to be discarded. This results in waste and also makes the installation/maintenance process difficult.

Therefore, there is a need for a flat panel speaker system, which provides optimum sound quality, is cost effective and is easy to install/maintain.

SUMMARY OF THE INVENTION

In one aspect of the present invention, a flat panel speaker system is provided. The system includes, a modified panel having a front surface and a rear surface, wherein the modified panel acts as a diaphragm for the flat panel speaker system; a supporting member coupled to the rear surface of the modified panel; and a detachable driver operationally coupled to the supporting member and supported by a bracket.

The modified panel thickness is less than the thickness of a main panel. The supporting member is shaped such that it aligns with the detachable driver. The bracket is secured using pads on the rear surface of the modified panel, and the pads are coupled to the modified panel using an adhesive.

In another aspect of the present invention, an interior aircraft panel is provided. The interior aircraft panel includes a modified section having a configuration adapted to function as a diaphragm for a flat-panel speaker, wherein modified section thickness is less than interior aircraft panel thickness.

In yet another aspect of the present invention, a method of manufacturing an interior aircraft panel is provided. The method includes forming the interior aircraft panel with a modified section having a configuration adapted to function as a diaphragm for a flat-panel speaker, wherein the modified section thickness is less than the overall interior aircraft panel thickness.

In another aspect of the present invention an aircraft is provided. The aircraft includes, one or more interior panels including a plurality of modified sections each having a configuration adapted to function as a diaphragm for a speaker; and an audio system including a plurality of drivers respectively and operatively disposed at the plurality of modified sections; and an amplifier circuit operatively coupled to the drivers.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE INVENTION

In one aspect of the present invention, a flat panel speaker system is provided. This speaker system with a detachable driver, can be inexpensively manufactured and assembled, and reliably installed without damaging the interior panel of the aircraft.

In another aspect of the present invention, a certain section of the interior panel of the airplane is modified and adapted to operate as a diaphragm for the speaker system. The airplane interior panel is modified by decreasing the rigidity of a selected designated section of the interior panel.

To facilitate an understanding of the preferred embodiment, the general architecture and operation of an audio system (for example, a PA system) will be described. The specific architecture and operation of the preferred embodiments will then be described with reference to the general architecture.

Figure 1A:
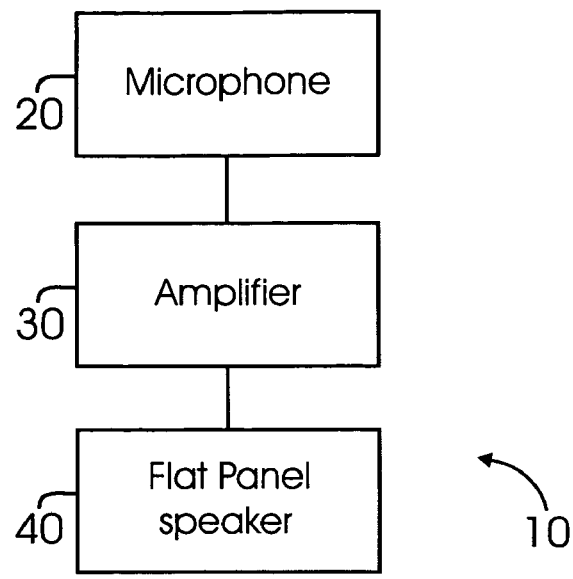
FIG. 1A shows a block diagram of a PA system.

FIG. 1A shows a block diagram of a PA system 10 that can be used in an aircraft, according to one aspect of the present invention. PA system 10 includes a microphone (or any input device) 20 that receives an audio input and converts it into an electrical signal, an amplifier 30 that is used to amplify the signals from the microphone 20, and a flat panel speaker system 40 that converts the amplified signals into sound. It is noteworthy that although FIG. 1A is used to show an example of a PA system, the adaptive aspects of the present invention are not limited to a PA system. The speaker configuration/design/structure described below may be used with any audio system.

To assure successful performance of a flat panel speaker in an aircraft environment, the interior panel (may also be referred to as "panel") material of the airplane plays an important part. The weight, stiffness and dampening capability of the panel are important. The interior panel of an airplane is generally made of a combination of fiber glass and a honeycomb core followed by a top layer of decorative laminate covering, and is structurally very strong.

The interior panel of an airplane is considered light weight as per the aviation industry standards. However, this panel is too heavy and too rigid if it is used as a diaphragm for a flat panel speaker application.

The standard aircraft interior panel material fails to reproduce reasonable lower to mid frequencies, for example, between 20 Hz-600 Hz, which is a major part of the 300 Hz-5 kHz PA system frequency range, and hence, distorts sound and is very inefficient. In one aspect of the present invention, a modified interior panel structure is provided that overcomes the inherent deficiencies of a standard interior panel of an aircraft and provides optimum sound quality within 20 Hz-600 Hz.

Figure 1B:
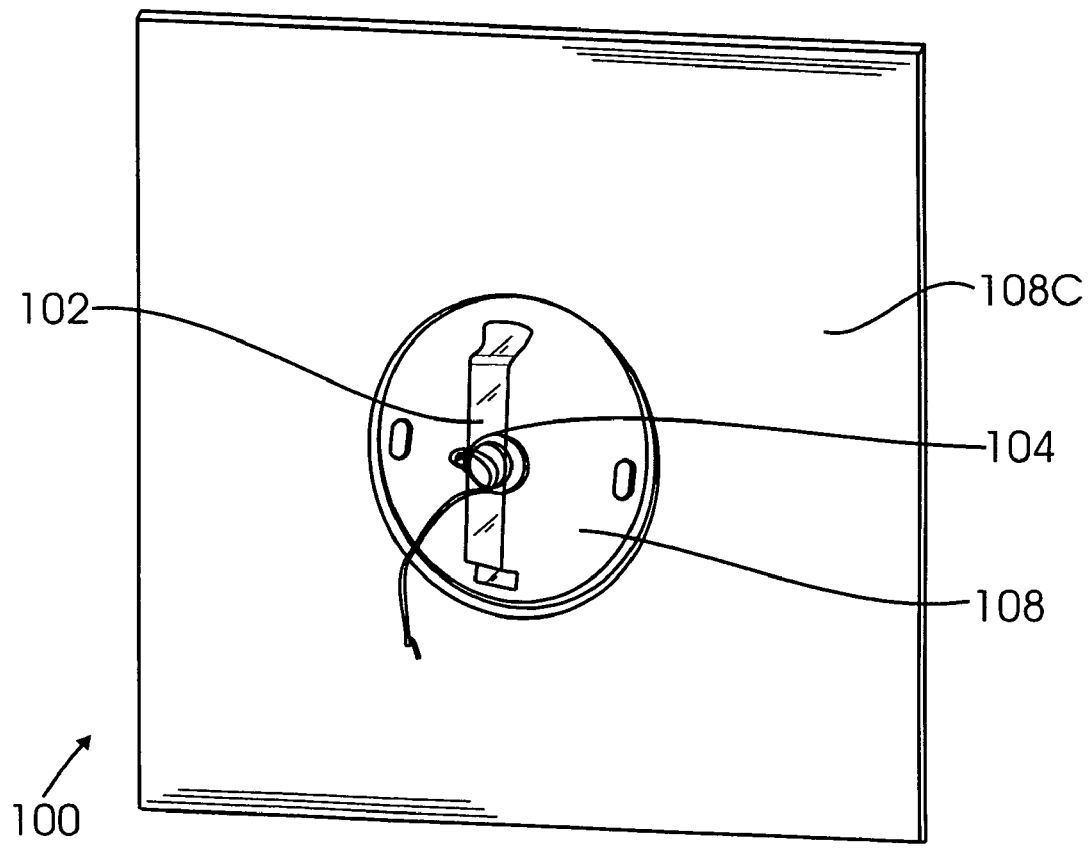
FIGS. 1B and 1C show rear views of the flat panel speaker system, according to one aspect of the present invention.
Figure 1C:
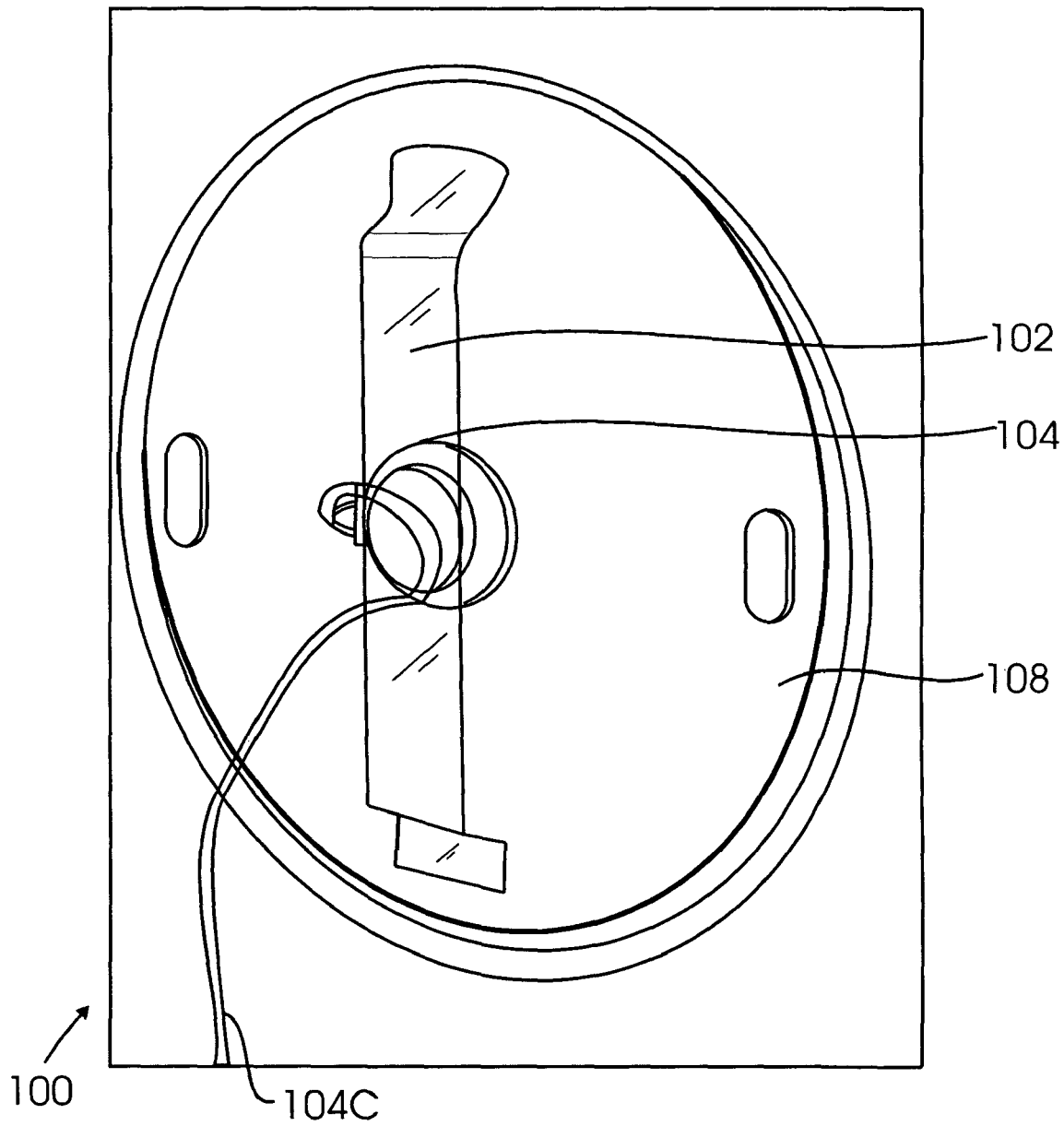

FIGS. 1B/1C show a flat panel speaker system 100 (similar to system 40, FIG. 1A) that uses a detachable driver 104 and a modified interior panel 108 to produce high quality sound. Modified panel 108 thickness is less than the thickness of the main panel 108C and is a recess in main panel 108C. A bracket 102 fastened to the modified panel 108 supports driver 104. Bracket 102 keeps driver 104 in the proper location. Driver 104 receives an electrical signal and produces sound waves that are transmitted out. It is noteworthy that main panel 108C may have more than one modified panel 108 segments.

In one aspect of the present invention, the aircraft interior panel (shown as 108C, FIG. 3) is modified (108) to function as a diaphragm. Modified panel 108 is created by decreasing the weight, stiffness, rigidity and depth of panel 108C. Modified panel 108 provides optimum sound quality. The panel's optimum thickness may be determined by a progressive thinning process where the thickness of panel 108C is decreased and each thinning step is followed by an audio test to verify optimum sound quality results.

Figure 2:
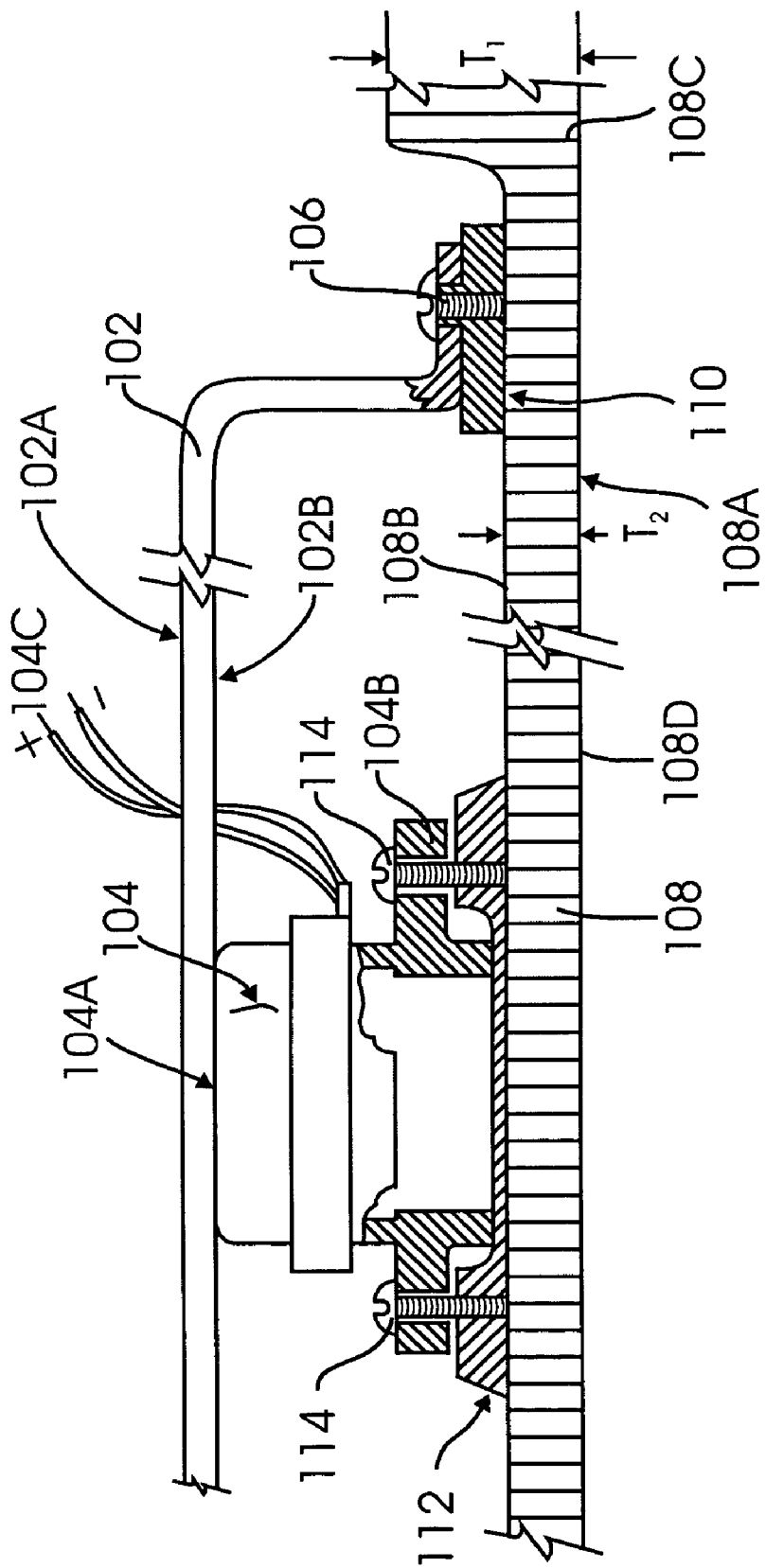
FIG. 2 is a cross-sectional view of the flat panel speaker system of FIG. 1B/1C.

FIG. 2 shows a cross-sectional view of the flat panel speaker system 100, according to one aspect of the present invention. System 100 comprises a modified aircraft interior panel 108 acting as a diaphragm. The modified panel 108 has a front surface 108A and a rear surface 108B. The front surface 108A may be covered with a decorative laminate layer (108D) and faces the passenger cabin of an aircraft. Modified panel 108 thickness (shown as T2) is less than the overall thickness of panel 108C (shown as T1) and hence can provide the desired acoustic quality.

The thickness T2 varies based on the type of material that is used for modified panel 108/panel 108C. In one aspect, thickness T2 for a panel with a honeycomb core can range from 0.125 inch to 0.188 inch for a speaker that is 8.00 inch in diameter. For a speaker that is greater than 8.00 inch in diameter, T2 can range from 0.125 inch to 0.500 inch. The thickness for the main panel (108C) is about 0.375 (3/8) inch.

It is noteworthy that the present invention is not limited to any particular material or thickness size. The thickness of the panel/modified section depends on the density of the panel and also on the overall diameter of the speaker. A larger speaker will permit a thicker material. In selecting the panel material, one should recognize that it cannot be too stiff or too soft to provide the optimum sound quality.

The honeycomb core structure works well for an aircraft, however other material, for example, a flute structure polyester board (used for sign boards and like) may also be used. Light density material, for example, foam-based materials may also be used with a thickness of up to 0.375 inch. Furthermore, panel 108C/108 structure may include more than one type of material that may laminate together.

A ring structure/supporting member (may also be referred to as a "plate") 112 is attached to the rear surface 108B of the modified panel 108. In one aspect, plate 112 is coupled to the rear surface 108B by using an adhesive or similar means. In a preferred embodiment, the shape of the plate 112 matches the shape of driver 104.

Driver 104 is coupled to plate 112 by using fasteners 114 through an opening (shown as 114A, FIG. 3) in the shoulder structure 104B. Power to driver 104 is provided via connection 104C.

Bracket 102 has a top surface 102A and a bottom surface 102B. The bottom surface 102B stays in contact with the top surface 104A of driver 104 and keeps the driver 104 in proper location. In one aspect, surface 102B and 104A are held together by using an adhesive or similar means.

The lateral ends (or shoulders) 102C of bracket 102 are fastened to pads 110. Pads 110 are secured on rear surface 108B using adhesives or similar means. Fasteners 106 extend through the openings (shown as 110A, FIG. 3) in pads 110 and are used to secure bracket 102.

Figure 3:
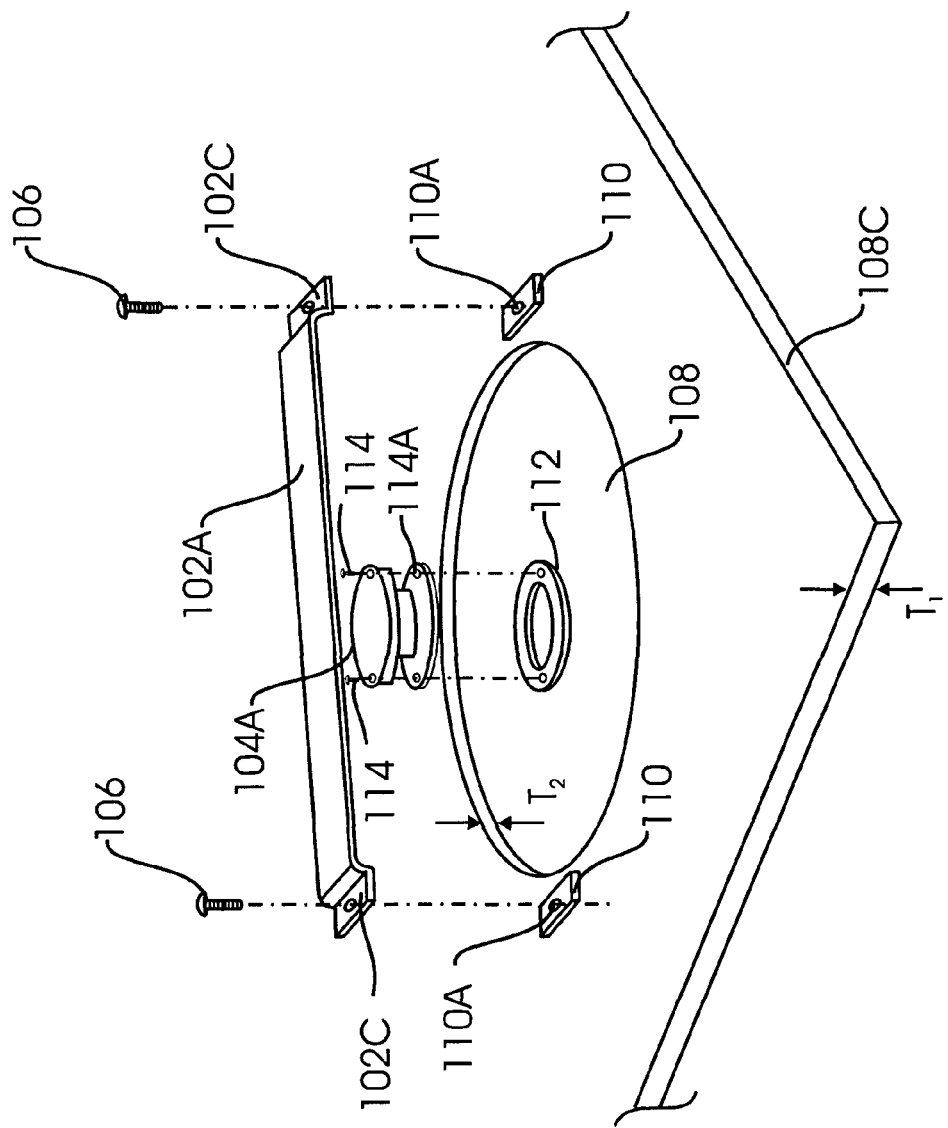
FIG. 3 shows an exploded view of the flat panel speaker system of FIG. 1B/1C.

FIG. 3 shows an exploded view of flat panel speaker system 100. As shown in FIG. 3, detachable driver 104 is safely secured onto plate 112 and bracket 102, to assure secure coupling conditions between driver 104 and diaphragm 108. This also prevents the driver from getting dislocated, and therefore maintains its optimum performing location/situation.

In one aspect of the present invention, the detachable driver 104 simplifies the installation/maintenance of the speaker system. Driver 104 can be easily replaced by unfastening fasteners 106 and 114 in pads 110 and plate 112, respectively. Driver 104 can be also fastened/unfastened using a "quarter turn" fastening mechanism between driver 104 and plate 112 without screws. This reduces waste and simplifies the installation process.

Figure 4:
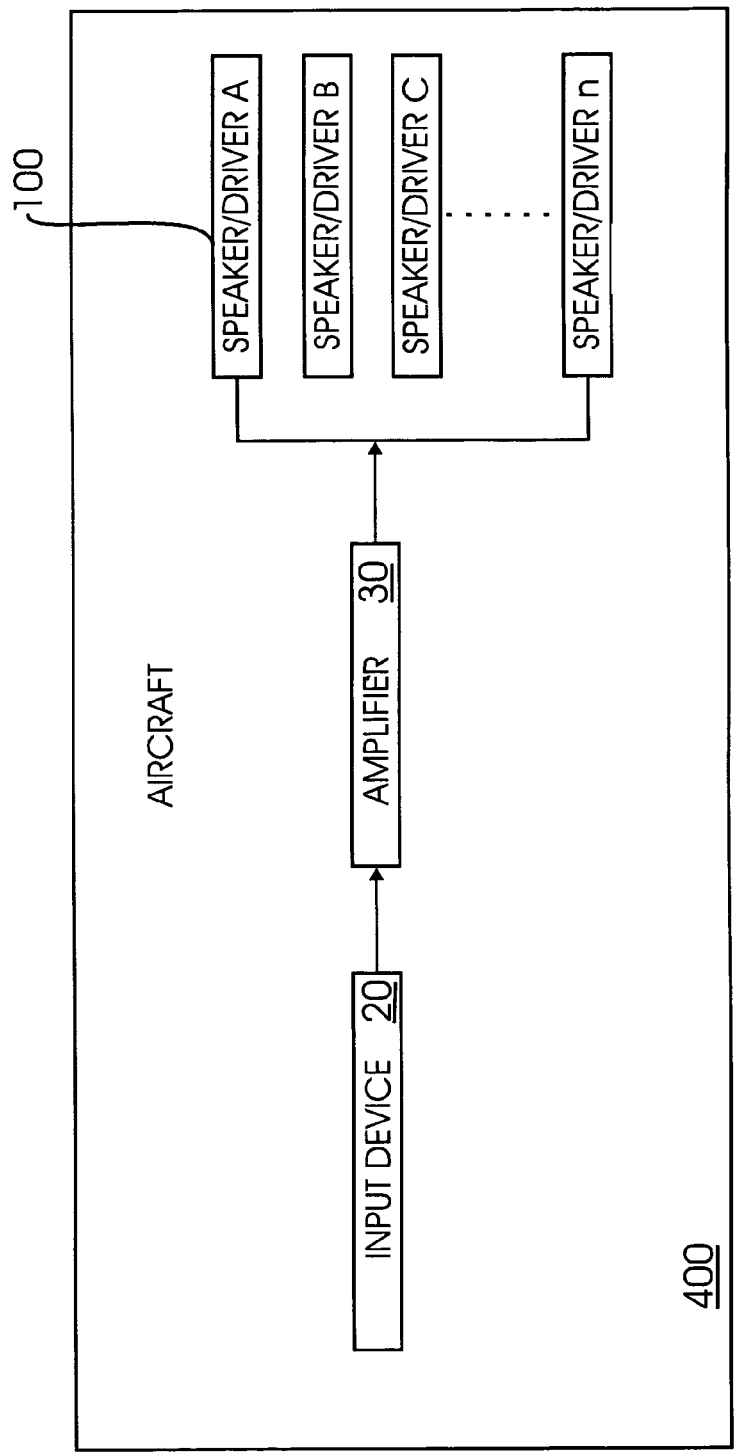
FIG. 4 shows a block diagram of an aircraft using the speaker configuration, according to one aspect of the present invention.

FIG. 4 shows a block diagram of an aircraft 400 that uses the speaker system 100 described above with respect to FIGS. 1B, 1C, 2 and 3. Aircraft 400 includes plural speakers 100 (shown as Speaker A, Speaker B-Speaker N). The speakers receive an electrical signal from amplifier 30 (that receives an input from an input system/device 20) and produce optimum sound within at least a frequency range of 300 Hz to 5,000 Hz with efficiency of 1 watt (root mean square ("RMS")) to produce an average of 90-95 dB audio level. In another aspect, the adaptive speaker can further produce acceptable audio in a frequency range that is both lower than 300 Hz and/or higher than 5,000 Hz. However, low frequency extension range may have to be controlled to avoid possible airplane interior architecture resonance. It is noteworthy that the system in aircraft 400 may be used in plural applications, where flat panel speakers can be used.

As will by now be evident to persons of skill in the art, many modifications, substitutions and variations can be made in and to the materials used for interior panel of the aircraft as well as methods of use of the reliable, low-cost, flat panel speaker system of the present invention without departing from its spirit and scope. It is understood, that the speaker system of the present invention may find use in vehicles or general domestic applications other than airplanes. All such uses are within the scope of the present invention.

Accordingly, the scope of the present invention should not be limited to the particular embodiments illustrated and described herein, as they are merely exemplary in nature, but rather, should be fully commensurate with that of the claims appended hereafter and their functional equivalents.

What is claimed is:

1. An interior aircraft panel comprising:
    the interior aircraft panel having a first thickness and a first stiffness, the first stiffness being incapable of reproducing a sound in a first frequency range of at least 20 Hz to 600 Hz, wherein the interior aircraft panel has a front surface and a rear surface;
    a modified section of the interior aircraft panel having been modified to have a second thickness that is less than the first thickness and a second stiffness that is less than the first stiffness, the modified section being configured to function as a diaphragm for a flat-panel speaker;
    a driver operatively secured to a rear surface of the modified section;
    a bracket extending across and contacting the rear surface of the driver to support the driver; wherein the bracket includes first and second ends, and the first and second ends are operatively secured to the panel, and wherein the first and second ends are operatively secured to the modified section; and
    wherein the interior aircraft panel and the modified section, in combination, are configured to reproduce the sound in a second frequency range of at least 300 Hz to 5000 Hz.

2. The interior aircraft panel of claim 1, wherein the interior aircraft panel has a front surface and a rear surface, the interior aircraft panel being contoured on the rear surface to define the modified section.

3. The interior aircraft panel of claim 1, wherein the modified section is unitary with a surrounding portion of the interior aircraft panel.

4. The interior aircraft panel of claim 1, wherein the modified section is configured to produce the sound in the frequency range of at least 300 Hz to about 5,000 Hz when subject to an appropriate input signal.

5. The interior aircraft panel of claim 1 wherein the modified section is configured to function as the diaphragm when subject to an input signal.

6. The interior aircraft panel of claim 1 wherein the interior aircraft panel includes composite material.

7. The interior aircraft panel of claim 1 further comprising a plurality of the modified sections.

8. The interior aircraft panel of claim 1 wherein the interior aircraft panel is comprised of a honeycomb core structure, the thickness of the modified section ranges from about 0.125 inch to about 0.188 inch for the honeycomb core structure for the flat-panel speaker with a diameter of about 8.00 inches.

9. The interior aircraft panel of claim 1 wherein the interior aircraft panel is comprised of a honeycomb core structure, the thickness of the modified section ranges from about 0.125 inch to about 0.50 inch for the honeycomb core structure for the flat-panel speaker with a diameter greater than 8.00 inches.

10. The interior aircraft panel of claim 9 wherein the thickness of an area for the honeycomb core structure surrounding the modified section is about 0.375 (3/8) inches.

11. The interior aircraft panel of claim 1 wherein the interior aircraft panel has a front surface and a rear surface, and the modified section is configured as a recess formed in the rear surface of the interior aircraft panel.

12. The interior aircraft panel of claim 11 wherein the front surface of the interior aircraft panel is substantially smooth.

13. The interior aircraft panel of claim 1, wherein a density of the interior aircraft panel is equal to a density of the modified section.

14. The interior aircraft panel of claim 1, further comprising pads secured to the rear surface of the modified section.

15. The interior aircraft panel of claim 14, wherein the first and second ends are detachably secured to the pads.

16. The interior aircraft panel of claim 15, further comprising mechanical fasteners detachably coupling the first and second ends to the pads.

17. The interior aircraft panel of claim 1, further comprising a supporting member coupled to the rear surface of the modified section.

18. The interior aircraft panel of claim 17, wherein the driver is detachably coupled to the supporting member.

19. The interior aircraft panel of claim 18, further comprising mechanical fasteners detachably coupling the driver to the supporting member.

20. An interior aircraft panel comprising:
    the interior aircraft panel, wherein the interior aircraft panel has a front surface and a rear surface; and
    a modified section of the interior aircraft panel, the modified section being configured to function as a diaphragm for a flat-panel speaker;
    a driver operatively secured to the rear surface of the modified section; and
    a bracket extending across and contacting the rear surface of the driver to support the driver; wherein the bracket includes first and second ends, and the first and second ends are operatively secured to the panel, and wherein the first and second ends are operatively secured to the modified section;
    wherein the interior aircraft panel and the modified section, in combination, are configured to reproduce a sound.

21. The interior aircraft panel of claim 20, wherein the sound is in a frequency range of at least 300 Hz to 5000 Hz.

22. The interior aircraft panel of claim 20, wherein the modified section is unitary with a surrounding portion of the interior aircraft panel.

23. The interior aircraft panel of claim 22, wherein a ring supporting member is attached to a rear surface of the modified section using an adhesive, and wherein a first shape of the ring supporting member substantially matches a second shape of the modified section.

24. The interior aircraft panel of claim 20, wherein the interior aircraft panel has a first thickness and a first weight, and wherein the modified section has a second thickness that is less than the first thickness and a second weight that is less than the first weight.

25. The interior aircraft panel of claim 20, wherein the modified section of the interior aircraft panel is a recess in the interior aircraft panel.

* * * * *